(12) United States Patent
Boyksen et al.

(10) Patent No.: US 8,155,804 B2
(45) Date of Patent: Apr. 10, 2012

(54) DEVICE AND METHOD FOR PROVIDING A FLIGHT STATUS SIGNAL

(75) Inventors: Guenther Boyksen, Brake (DE); Kai Bredemeier, Bremen (DE); Torsten Frerichs, Hude (DE); Kasch Eckhard, Rotenburg (DE); Sven Kasdorf, Hollern (DE); Ult Kehlenbeck, Wehe (DE); Thorsten Knijnenburg, Bremen (DE); Max Neumeyer, Bremen (DE); Kai Ottilige, Bremen (DE); Frank Steins, Osterholz-Scharmbeck (DE)

(73) Assignee: Airbus Operations GmbH, Hamburg (DE)

( * ) Notice: Subject to any disclaimer, the term of this patent is extended or adjusted under 35 U.S.C. 154(b) by 621 days.

(21) Appl. No.: 12/249,828

(22) Filed: Oct. 10, 2008

(65) Prior Publication Data
US 2009/0099713 A1    Apr. 16, 2009

Related U.S. Application Data

(60) Provisional application No. 60/979,789, filed on Oct. 12, 2007.

(51) Int. Cl.
*G06F 19/00* (2006.01)
(52) U.S. Cl. ................. 701/14; 701/3; 340/971
(58) Field of Classification Search .......... None
See application file for complete search history.

(56) References Cited

U.S. PATENT DOCUMENTS

| 4,891,971 | A | * | 1/1990 | Jones et al. ............... 73/112.01 |
| 5,446,666 | A | | 8/1995 | Bauer |
| 5,826,833 | A | * | 10/1998 | Evans et al. .................. 244/183 |
| 7,137,595 | B2 | * | 11/2006 | Barba .......................... 244/129.5 |
| 2009/0089324 | A1 | * | 4/2009 | Dwyer ....................... 707/104.1 |

FOREIGN PATENT DOCUMENTS

| DE | 34 17 884 C2 | 12/1984 |
| DE | 43 09 058 C1 | 12/1994 |
| DE | 695 15 847 T2 | 11/1996 |
| DE | 698 19 843 T2 | 4/2004 |
| DE | 698 22 588 T2 | 2/2005 |
| DE | 10 2004 026 711 A1 | 12/2005 |
| EP | 0909704 A2 * | 4/1999 |

OTHER PUBLICATIONS

German Office Action, German Application No. 10 2007 048 956.2-22, Apr. 2, 2008, 6 pages.

* cited by examiner

*Primary Examiner* — Michael J. Zanelli
(74) *Attorney, Agent, or Firm* — Fenwick & West LLP

(57) ABSTRACT

The present invention provides a device for providing an aircraft flight status signal which indicates whether the aircraft is in the air or on the ground, which device calculates the flight status signal as a function of a number of differently provided flight speed signals, a number of differently provided engine status signals, a number of differently provided evacuation signals, a number of differently provided front undercarriage status signals and a number of differently provided main undercarriage status signals.

26 Claims, 5 Drawing Sheets

DEVICE AND METHOD FOR PROVIDING A FLIGHT STATUS SIGNAL

CROSS-REFERENCE TO RELATED APPLICATIONS

This application claims the benefit of U.S. Provisional application No. 60/979,789 filed Oct. 12, 2007, the entire disclosure of which is herein incorporated by reference.

FIELD OF THE INVENTION

The present invention relates to a device and a method for providing a flight status signal, in particular in the field of air travel and space travel.

BACKGROUND OF THE INVENTION

Although it can be used in any field, the present invention will be explained in greater detail in relation to an aircraft or passenger aircraft.

In current aircraft, in particular in the communication and data systems of the aircraft, there is no signal available which is capable of indicating whether the aircraft is on the ground or in the air.

Accordingly, an object of the present invention is to provide a signal which indicates whether the aircraft is on the ground or in the air.

Furthermore, an object is to provide a signal with a high level of reliability which indicates whether the aircraft is on the ground or in the air.

The Applicant has further determined that such a signal could be very advantageous for a large number of different systems of the aircraft. For example, such a signal could be used to generate a door closure signal which indicates whether one or more doors of the aircraft are to be locked or not.

Consequently, a further object of the present invention is to provide a situation-dependent door closure signal for locking at least one door of the aircraft.

A further object is to provide a situation-dependent door closure signal with a high level of reliability for locking at least one door of the aircraft.

SUMMARY OF THE INVENTION

At least one of these objects set out is achieved by at least one device and/or by at least one system and/or by at least one method and/or by at least one vehicle.

Accordingly, a device is proposed for providing an aircraft flight status signal which indicates whether the aircraft is in the air or on the ground, the device calculating the flight status signal as a function of a number N1 of differently provided flight speed signals, a number N2 of differently provided engine status signals, a number N3 of differently provided evacuation signals, a number N4 of differently provided front undercarriage status signals and a number N5 of differently provided main undercarriage status signals.

Preferably, a flight status signal indicates with a positive logical level that the aircraft is in the air. Consequently, a flight status signal indicates with a negative logical level that the aircraft is on the ground.

Of course, this logic may be transposed. Furthermore, an inverted flight status signal represents a ground status signal.

Furthermore, in particular in the field of air and space travel, a system is proposed which has at least one device as described above and a bus, preferably an Ethernet bus, in a particularly preferred manner, an AFDX bus, which is capable of transmitting at least the provided flight speed signals, the engine status signals, the evacuation signals, the front undercarriage status signals and the main undercarriage status signals to the device described above.

Furthermore, a method is proposed for providing an aircraft flight status signal which indicates whether the aircraft is in the air or on the ground, the method involving the following steps:

providing a number N1 of different flight speed signals;
providing a number N2 of different engine status signals;
providing a number N3 of evacuation signals;
providing a number N4 of different front undercarriage status signals;
providing a number N5 of different main undercarriage status signals; and
calculating the flight status signal as a function of the different flight speed signals, the different engine status signals, the evacuation signals, the different front undercarriage status signals and the different main undercarriage status signals.

Furthermore, the present invention provides a system having a device as described above and at least one means which is capable of generating a door closure signal for at least one door of the aircraft as a function of the calculated flight status signal, a number N12 of differently provided flight altitude signals, the number N3 of differently provided evacuation signals and at least one pressure differential signal.

Furthermore, the present invention provides a method for generating a door closure signal for locking at least one door of an aircraft, which method involves the following steps:

calculating a flight status signal in accordance with the method described above for calculating the flight status signal;
providing a number N12 of different flight altitude signals;
providing a number N3 of evacuation signals;
providing at least one pressure differential signal; and
calculating the door closure signal from the calculated flight status signal, the number N12 of different flight altitude signals, the number N3 of evacuation signals and the pressure differential signal.

The dependent claims relate to advantageous configurations and improvements of the invention.

According to a preferred configuration of the device for providing the flight status signal, the device is capable of receiving the flight speed signals, the engine status signals, the evacuation signals, the front undercarriage status signals and/or the main undercarriage status signals by means of a bus, preferably by means of an Ethernet bus, in a particularly preferred manner, by means of an AFDX bus.

According to a preferred development of this device, a number N1 of threshold value units is provided, the respective n1th threshold value unit $n1 \epsilon [1, \ldots, N1]$ setting an n1th flight speed status at a positive logical level on the output side if the flight speed signal received in each case on the input side is greater than a predetermined threshold value.

According to another preferred development of this device, a first logic operation unit is provided and, on the output side, sets a global flight speed status at a positive logical level if at least one predeterminable number N1', N1'<N1, in particular N1'=N1−1, of the flight speed statuses received on the input side has a positive logical level.

According to another preferred development of this device, a second logic operation unit is provided and, on the output side, sets a global engine status to a positive logical level if at least one predeterminable number N2', N2'<N2, in particular N2′=N2−1, of the engine status signals received on the input side has a positive logical level.

According to another preferred development of this device, a third logic operation unit is provided and, on the output side, sets a global front undercarriage status and/or a global main undercarriage status to a positive logical level in each case in accordance with a respectively predeterminable dependence on the evacuation signals received on the input side, the front undercarriage status signals and the main undercarriage status signals.

According to another preferred development of this device, a fourth logic operation unit is provided and receives, on the input side, the global flight speed status, the global engine status, the global front undercarriage status and the global main undercarriage status and, on the output side, sets the flight status signal at a positive logical level if at least one predeterminable number N6, N6<4, in particular N6=3, of the statuses received has a positive logical level.

According to a preferred development of the system with the device for providing the flight status signal, there is provided a number N1 of dedicated calculation units which provide N1 redundant flight speed signals.

According to a preferred configuration of this system, a number N7 of redundant engine control devices for an engine of a number N8 of engines of the aircraft are respectively provided, where $$N7 = \frac{N2}{N8},$$

and provide N7 redundant engine status signals for the corresponding engine.

According to another preferred development of this system, a number N9 of redundant main undercarriage control devices are respectively provided for a main undercarriage of a number N10 of main undercarriages of the aircraft, where $$N9 = \frac{N5}{N10},$$

and provide N9 redundant main undercarriage status signals for the corresponding main undercarriage.

According to another preferred development of this system, at least one cabin communication data system (Cabin Intercommunications Data System) is provided and provides N3 redundant evacuation signals.

According to another preferred development of this system, there are provided a number N11 of redundant front undercarriage control devices which provide N4 redundant front undercarriage status signals, where N11=N4, for a front undercarriage of the aircraft.

According to a preferred development of the system with the means for generating the door closure signal, there is provided a flight lock actuator which receives the generated door closure signal and, as a function thereof, locks at least one door of the aircraft.

According to another preferred development of this system, a number N13 of evaluation units are provided, the respective n13th evaluation unit, n13∈[1, ..., N13], setting an n13th cruising altitude status at a positive logical level on the output side if the respective flight altitude signal received on the input side is greater than a predetermined first threshold value, for example, 26,000 ft, setting it at a negative logical signal level if the respective flight altitude signal received on the input side is less than a second predeterminable threshold value, for example, 24,000 ft., which is less than the first threshold value and leaving the logical level of the cruising altitude status unchanged as long as the flight altitude signal received on the input side is less than or equal to the first threshold value and is greater than or equal to the second threshold value.

According to another preferred development of this system, a fifth logic operation unit is provided and, on the output side, sets an item of global cruising altitude display data at a positive logical level if the majority of the N12 cruising altitude statuses received on the input side have a negative logical level.

According to another preferred development of this system, a sixth logic operation unit is provided, in particular a NOR gate which carries out a NOR logic operation on the N3 evacuation signals received on the input side in order to provide a global evacuation status on the output side.

According to another preferred development of this system, an additional threshold value unit is provided and, on the output side, sets a pressure differential status at a positive logical level if the pressure differential signal received, which indicates a pressure difference between a cabin pressure of the cabin and an external atmospheric pressure, is greater than a predeterminable threshold value, for example, 2.5 hPa.

According to another preferred development of this system, a seventh logic operation unit is provided and receives, on the output side, the item of global cruising altitude display data, the global evacuation status, the flight status signal and the pressure differential status, and generates the door closure signal in accordance therewith.

According to another preferred configuration of this system, the seventh logic operation unit is constructed as an AND gate.

BRIEF DESCRIPTION OF THE DRAWINGS

The invention is explained below with reference to embodiments and to the appended Figures, in which.

In the Figures, the same reference numerals indicate components which are identical or identical in terms of function, unless indicated otherwise.

DETAILED DESCRIPTION OF THE INVENTION

Figure 1:
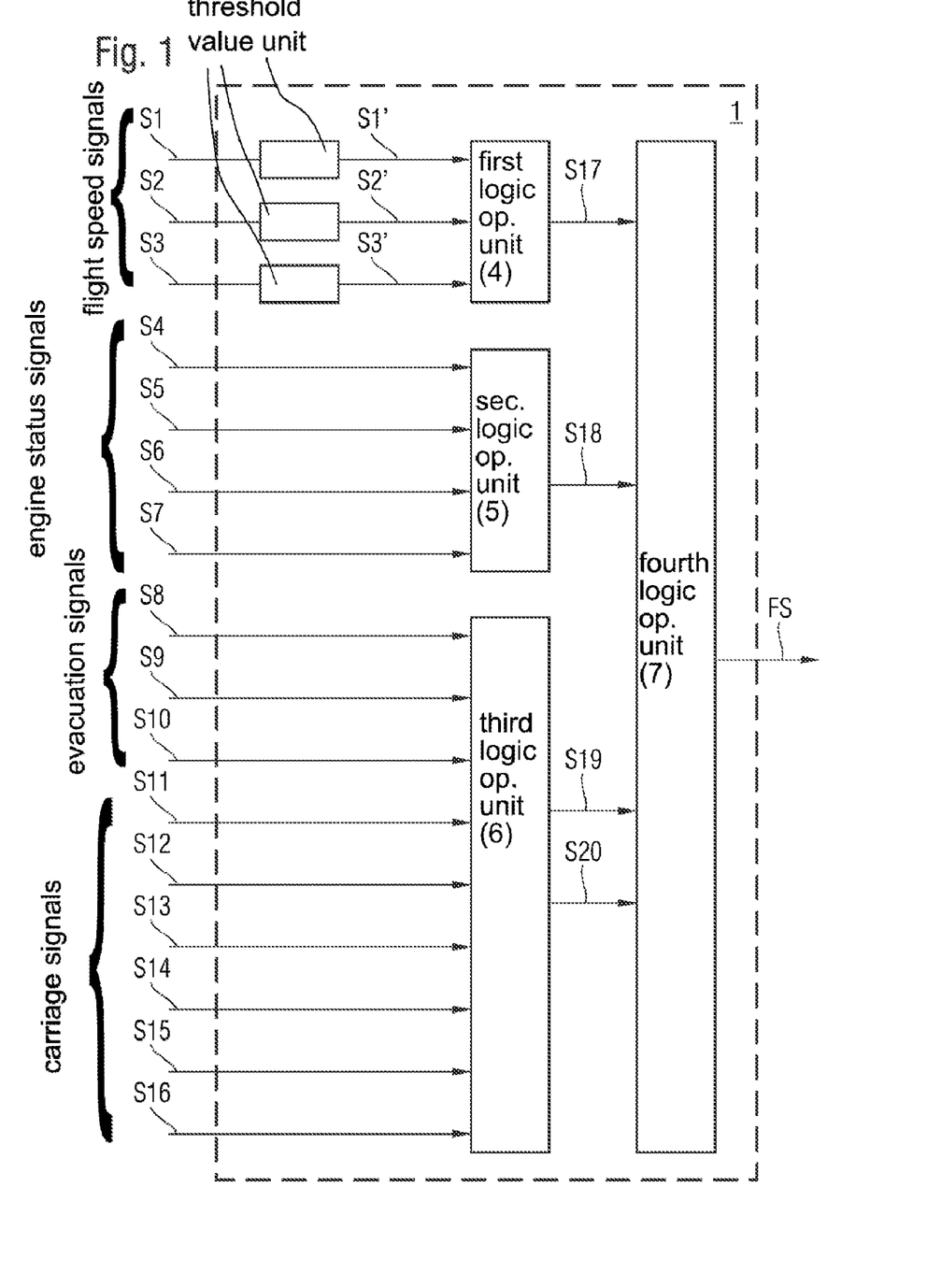
FIG. 1 is a schematic block diagram of an embodiment of a device for providing a flight status signal according to the present invention.

FIG. 1 illustrates a schematic block diagram of an embodiment of a device 1 for providing a flight status signal FS.

The device 1 calculates the flight status signal FS as a function of a number N1 of differently provided flight speed signals S1-S3, a number N2 of differently provided engine status signals S4-S7, a number N3 of differently provided evacuation signals S8-S10, a number N4 of differently provided front undercarriage status signals S11, S12 and a number N5 of differently provided main undercarriage status signals S13-S16.

Preferably, the device 1 is capable of receiving the signals S1-S16 by means of a bus 2. The bus 2 is preferably configured as an Ethernet bus, preferably as an AFDX bus. Furthermore, a number N1 of threshold value units 31-33 are provided, the respective n1th threshold value unit 31-33, n1∈[1, ..., N1], setting an n1th flight speed status S1'-S3' at a positive logical level on the output side if the flight speed signal S1-S3 received on the output side in each case is greater than a predetermined threshold value. For example, the first threshold value unit 31 sets the first flight speed status S1' at a positive logical level if the first flight speed signal S1 received on the input side is greater than the predeterminable threshold value.

The device 1 may also have a first logic operation unit 4 which, on the output side, sets a global flight speed status S17 at a positive logical level if at least one predeterminable number N1', N1'<N1, preferably N1'=N1−1 of the flight speed statuses S1'-S3' received on the input side has a positive logical level. For example, the first logic operation unit 4 according to FIG. 1 will set the flight speed status S17 at a positive logical level if at least two of the input signals S1'-S3' have a positive logical level.

Furthermore, the device 1 may also have a second logic operation unit 5 which, on the output side, sets a global engine status S18 at a positive logical level if at least one predeterminable number N2', N2'<N2, in particular N2'=N2−1 of the engine status signals S4-S7 received on the input side has a positive logical level.

Preferably, the device 1 may also have a third logic operation unit 6 which, on the output side, sets a global front undercarriage status S19 to a positive logical level in accordance with a predeterminable dependence on the evacuation signals S8-S10 which are received on the input side, the front undercarriage status signals S11, S12 and the main undercarriage status signals S13-S16. Furthermore, the third logic operation unit 6 may also be configured, on the output side, to set a global main engine status S20 at a positive logical level in accordance with a predeterminable dependence on the evacuation signals S8-S10 received on the input side, the front undercarriage status signals S11, S12 and the main undercarriage status signals S13-S16.

Furthermore, the device 1 may also have a fourth logic operation unit 7 which, on the input side, receives the global flight speed status S17, the global engine status S18, the global front undercarriage status S19 and the global main undercarriage status S20 and, on the output side, sets the flight status signal FS at a positive logical level if at least one predeterminable number N6, N6≦4, in particular N6=3, of received statuses S17-S20 has a positive logical level.

Figure 2:
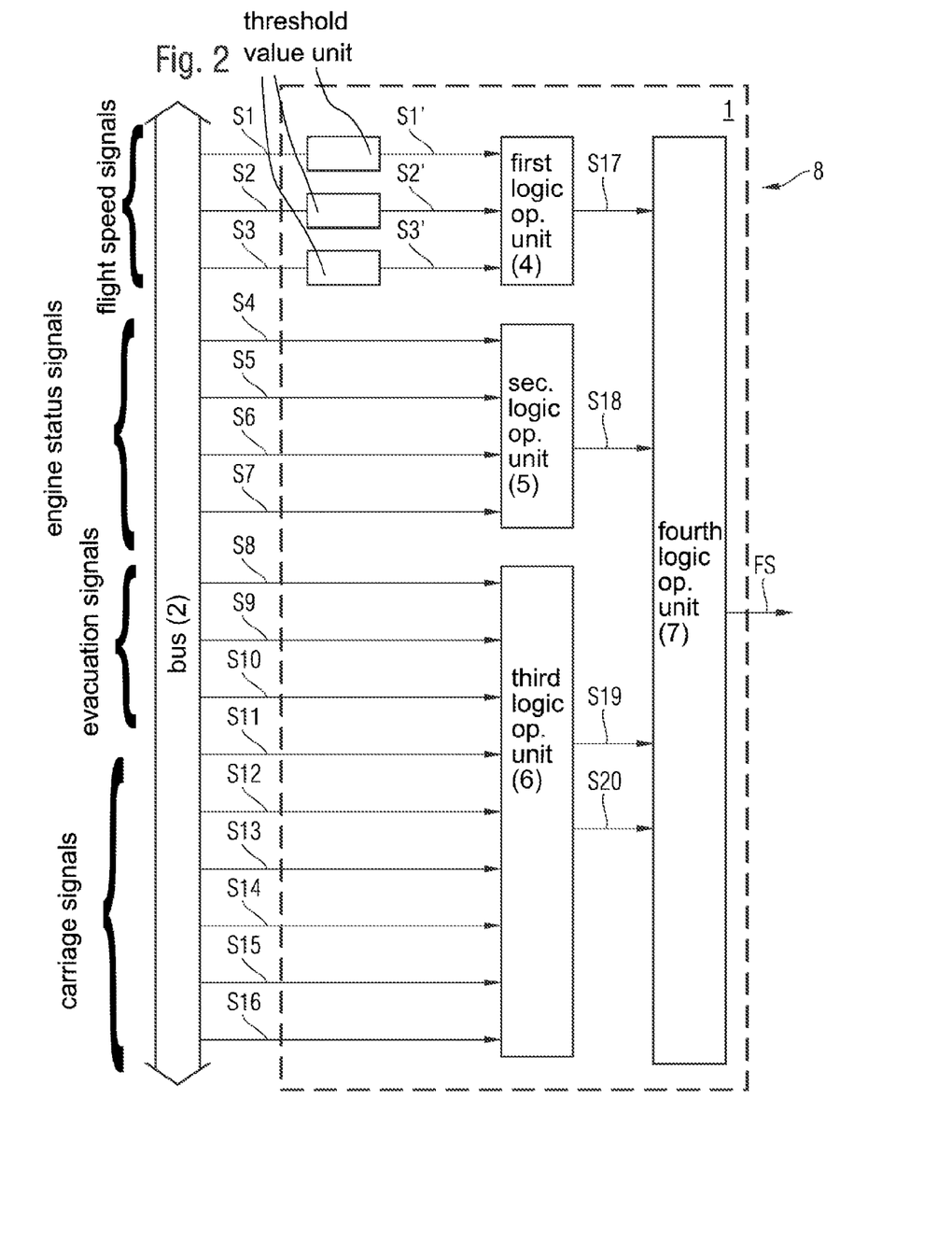
FIG. 2 is a schematic block diagram of an embodiment of a system with a device according to FIG. 1.

FIG. 2 is a schematic block diagram of an embodiment of a system 8 with a device 1 according to FIG. 1. The system 8 according to FIG. 2 has a bus 2 in addition to the device 1 according to FIG. 1. The bus 2 is preferably constructed as an Ethernet bus, in a particularly preferred manner as an AFDX bus. The bus 2 is capable of transmitting at least the provided flight speed signals S1-S3, the engine status signals S4-S7, the evacuation signals S8-S10, the front undercarriage status signals S11-S12 and the main undercarriage signals S13-S16 to the device 1.

Preferably, the system 8 according to FIG. 2 has a number N1 of dedicated calculation units (not illustrated) which provide N1 redundant flight speed signals S1-S3.

Preferably, the system 8 may also have a number N7 of redundant engine control devices (not illustrated) for an engine of a number N8 of engines of the aircraft, N7=N2/N8, which provide N7 redundant engine status signals S4-S7 for the corresponding engine.

Furthermore, the system 8 may also provide in each case a number N9 of redundant main undercarriage control devices (not illustrated) for a main undercarriage of a number N10 of main undercarriages of the aircraft, $$N9 = \frac{N5}{N10},$$

which provide N9 redundant main undercarriage status signals S13-S16 for the corresponding main undercarriage. For example, N10=2 and the aircraft has a left-hand main undercarriage and a right-hand main undercarriage.

Furthermore, the system 8 may also have a cabin communication data system which provides N3 redundant evacuation signals S8-S10.

Furthermore, the system 8 may also have a number N11 of redundant front undercarriage control devices which provide N4 redundant front undercarriage status signals, N11=N4, for a front undercarriage of the aircraft.

Figure 3:
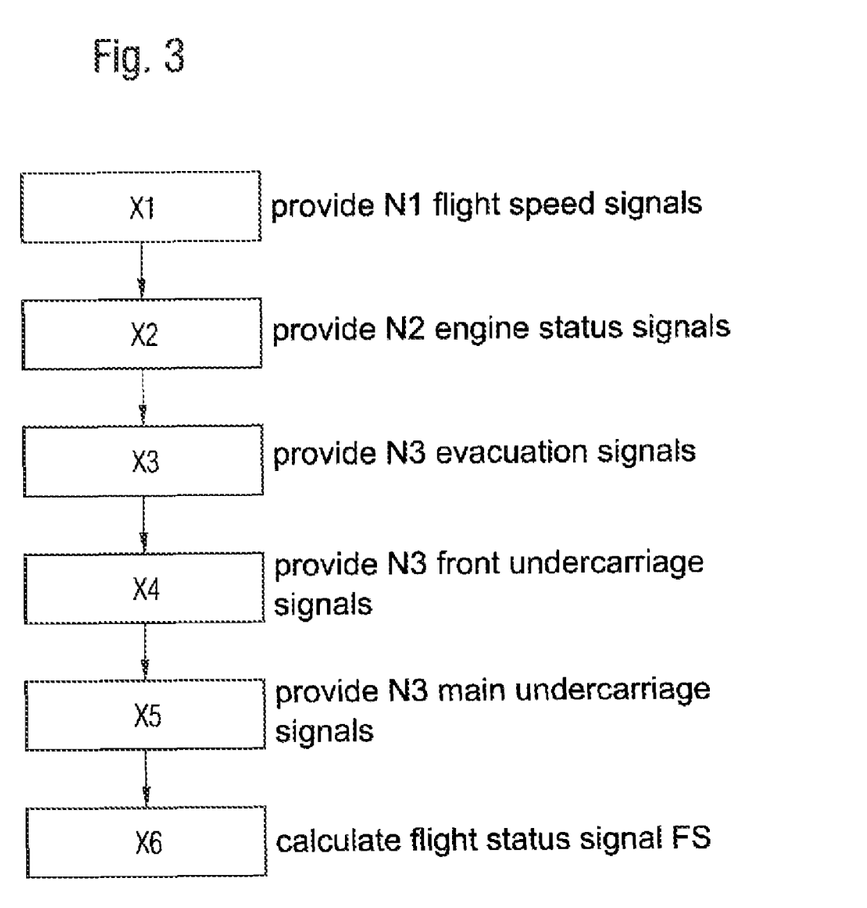
FIG. 3 is a schematic flow chart of an embodiment of a method for calculating a flight status signal in accordance with the present invention.

FIG. 3 is a schematic flow chart of an embodiment of a method for calculating a flight status signal FS in accordance with the present invention. The method according to the invention for calculating the flight status signal FS is explained in greater detail below with reference to the block diagram in FIG. 3 in relation to the block diagram in FIG. 1. The method according to the invention in accordance with FIG. 3 involves the following method steps X1-X6:

Method step X1:
A number N1 of different flight speed signals S1 to S3 is provided.

Method step X2:
A number N2 of different engine status signals S4-S7 is provided.

Method step X3:
A number N3 of evacuation signals S8-S10 is provided.

Method step X4:
A number N4 of different front undercarriage status signals S11, S12 is provided.

Method step X5:
A number N5 of different main undercarriage status signals S13-S16 is provided.

Method step X6:
The flight status signal FS is calculated as a function of the different flight speed signals S1-S3, the different engine status signals S4-S7, the evacuation signals S8-S10, the different front undercarriage status signals S11, S12 and the different main undercarriage status signals S13-S16.

Figure 4:
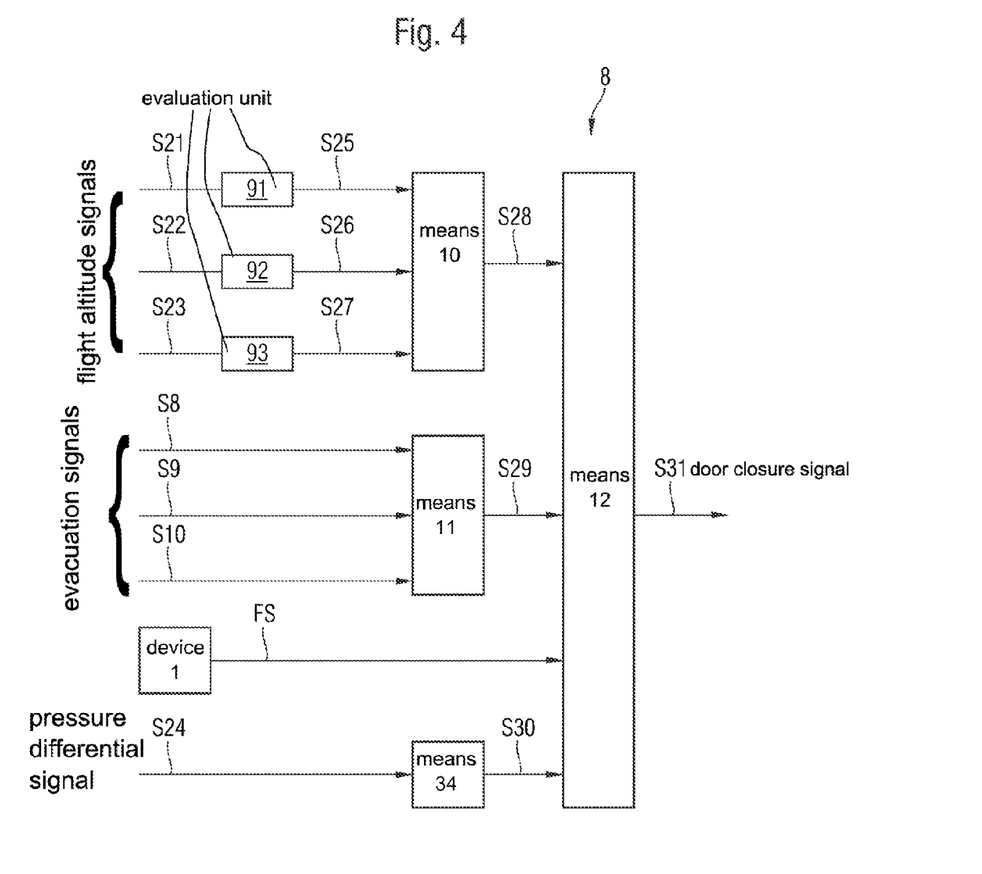
FIG. 4 is a schematic block diagram of an embodiment of a system for generating a door closure signal according to the present invention.

FIG. 4 is a schematic block diagram of an embodiment of a system 8 for generating a door closure signal S31 according to the present invention. The system 8 has a device 1 according to FIG. 1 and at least one means 10-12, 34. The means 10-12, 34 is capable of generating the door closure signal S31 for at least one door of the aircraft as a function of the calculated flight status signal FS, the number N12 of differently provided flight altitude signals S21-23, the number N3 of differently provided evacuation signals S8-S10 and at least one pressure differential signal S24.

Preferably, the system 8 has a flight lock actuator (not illustrated) which receives the generated door closure signal S31 and subject thereto, locks at least one door of the aircraft.

Furthermore, the system 8 may also have a number N13 of evaluation units 91-93, the respective n13th evaluation unit 91-93, n13∈[1, . . . , N13], setting an n13th cruising altitude status S25-S27 at a positive logical level on the output side if the respective flight altitude signal S21-S23 received in each case on the input side is greater than a predeterminable first threshold value, for example, 26,000 ft., setting it at a negative logical level if the respective flight altitude signal S21-S23 received on the input side is less than a predeterminable second threshold value, for example, 24,000 ft., which is less than the first threshold value and leaving the logical level of the cruising altitude status S25-S27 unchanged as long as the flight altitude signal S21-S23 received on the input side is less than or equal to the first threshold value and greater than or equal to the second threshold value.

Figure 5:
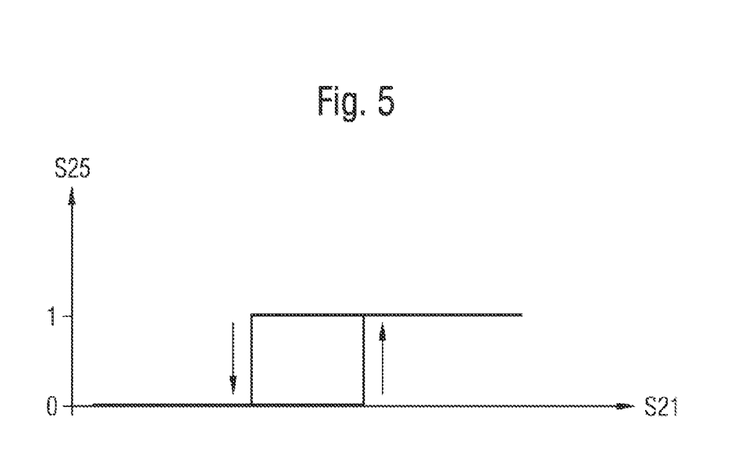
FIG. 5 is a chart for illustrating the cruising altitude status subject to the cruising altitude signal.

In this regard, FIG. 5 is an exemplary chart to illustrate the cruising altitude status S25 as a function of the cruising altitude signal S21. In particular, FIG. 5 illustrates, for the cruising altitude status S25, a hysteresis line which is indicated by the first evaluation unit 91 for the first cruising altitude signal S21.

Furthermore, the system 8 according to FIG. 4 may also have a fifth logic operation unit 10 which, on the output side, sets an item of global cruising altitude display data S28 at a positive logical level if the majority of the N12 flight altitude statuses S25-27 received on the input side have a negative logical level. If, for example, according to FIG. 4, two of the signals S25-S27 are set at a negative logical level, the fifth logic operation unit 10 sets the item of global cruising altitude display data S28 at a positive logical level and consequently indicates that the aircraft is below the second threshold value, for example, 24,000 ft.

Furthermore, the system 8 according to FIG. 4 may have a sixth logic operation unit 11. The sixth logic operation unit 11 is configured in particular as a NOR gate. The NOR gate 11 carries out a NOR logic operation on the N3 evacuation signals S8-S10 received on the input side in order to provide a global evacuation signal S29 on the output side.

Furthermore, the system 8 may have a threshold value unit 34 which, on the output side, sets a pressure differential status S30 at a positive logical level if the pressure differential signal S24 received, which indicates a pressure difference between a cabin pressure of the cabin of the aircraft and an external atmospheric pressure, is greater than a predeterminable threshold value, for example, 2.5 hPa. To this end, the threshold value unit 34 has, for example, a membrane and a downstream switch.

Furthermore, the system 8 may also have a seventh logic operation unit 12 which receives, on the input side, the item of global cruising altitude display data S28, the global evacuation status S29, the flight status signal FS and the pressure differential status S30 and subject thereto, generates the door closure signal S31. The seventh logic operation unit 12 is configured in particular as an AND gate.

Figure 6:
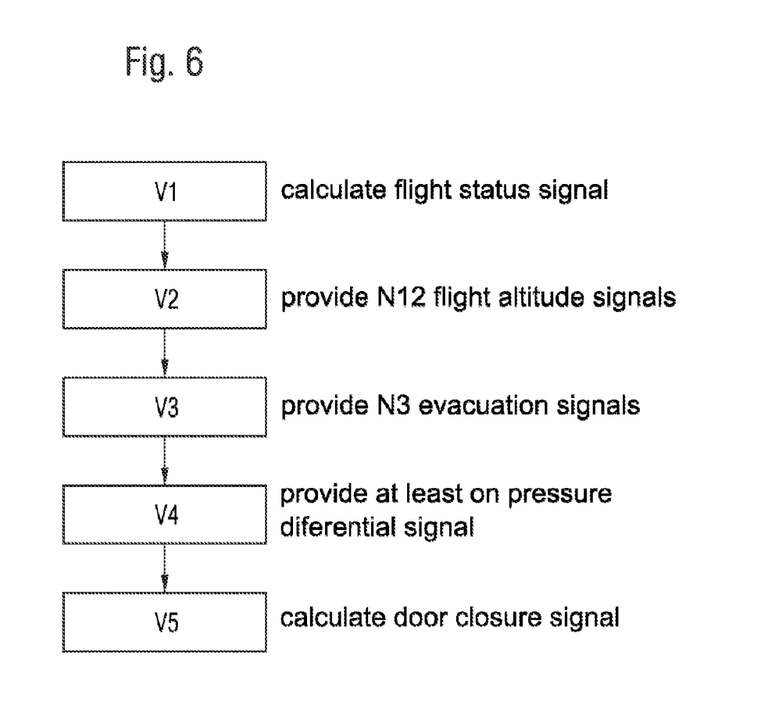
FIG. 6 is a schematic flow chart of an embodiment of a method for generating a door closure signal according to the present invention.

FIG. 6 is a schematic flow chart of an embodiment of a method for generating a door closure signal FS. The method for generating the door closure signal FS is explained below with reference to the block diagram in FIG. 6 in relation to the block diagram in FIG. 4. The method according to the invention according to FIG. 6 involves the following method steps V1-V5:

Method step V1:
The flight status signal FS is calculated in accordance with the method according to FIG. 3.

Method step V2:
A number N12 of different flight altitude signals S21-S23 is provided. These are preferably provided by means of a bus 2.

Method step V3:
A number N3 of evacuation signals S8-S10 is provided, in particular by means of the bus 2.

Method step V4:
At least one pressure differential signal S24 is provided, in particular by means of the bus 2.

Method step V5:
The door closure signal S31 is calculated from the calculated flight status signal FS, the number N12 of different flight altitude signals S21-S23, the number N3 of evacuation signals S8-S10 and the at least one pressure differential signal S24.

Although the present invention has been described with reference to preferred embodiments, it is not limited thereto but instead can be modified in many ways. For example, it is conceivable to transpose the logic described above in order to set or not to set a status or an item of display data. Furthermore, the present invention can be used not only in aircraft but also in space crafts.

What is claimed is:

1. An apparatus for providing an aircraft flight status signal, comprising:
   a device configured to calculate the flight status signal, the device comprising:
      a signal input section configured to receive a number of differently provided flight speed signals, a number of differently provided engine status signals, a number of differently provided evacuation signals, a number of differently provided front undercarriage status signals and a number of differently provided main undercarriage status signals;
      at least one signal evaluation device configured to generate the flight status signal as a function of the received flight speed signals, engine status signals, evacuation signals, front undercarriage status signals and main undercarriage status signals; and
      a signal output section configured to output the flight status signal;
   wherein the flight status signal indicates whether the aircraft is in the air or on the ground.

2. The apparatus according to claim 1, wherein:
   the device is capable of receiving the flight speed signals, the engine status signals, the evacuation signals, the front undercarriage status signals and the main undercarriage status signals by means of a bus.

3. The apparatus according to claim 1, wherein:
   the signal evaluation device comprises a number of threshold value units, the respective $n1^{th}$ threshold value unit, n1 ∈ [1, . . . , N1], being configured to set an $n1^{th}$ flight speed status at a positive logical level on an output side of the $n1^{th}$ threshold value unit if the flight speed signal received in each case on an input side of the $n1^{th}$ threshold value unit is greater than a predeterminable threshold value, and
   the signal evaluation device generates the flight status signal based on the flight speed statuses.

4. The apparatus according to claim 3, wherein:
   the signal evaluation device comprises a first logic operation unit configured to set, on an output side of the first logic operation unit, a global flight speed status at a positive logical level if at least one predeterminable number N1', N1'<N1, in particular N1'=N1-1, of the flight speed statuses received on an input side of the first logic operation unit has a positive logical level, and the signal evaluation device generates the flight status signal based on the global flight speed status.

5. The apparatus according to claim 1, wherein:

the signal evaluation device comprises a second logic operation unit configured to set, on an output side of the second logic operation unit, a global engine status at a positive logical level if at least one predeterminable number N2', N2'<N2, in particular N2'=N2−1, of the engine status signals received on an input side of the second logic operation unit has a positive logical level, and the signal evaluation device generates the flight status signal based on the global engine status.

6. The apparatus according to claim 1, wherein:

the signal evaluation device comprises a third logic operation unit configured to set, on an output side of the third logic operation unit, a global front undercarriage status and/or a global main undercarriage status at a positive logical level in each case in accordance with a predeterminable dependence on the evacuation signals, the front undercarriage status signals and the main undercarriage status signals received on an input side of the third logic operation unit, and the signal evaluation device generates the flight status signal based on the global front undercarriage status and/or the global main undercarriage status.

7. The apparatus according to claim 1, wherein:

the signal evaluation device comprises a fourth logic operation unit configured to receive, on an input side of the fourth logic operation unit, a global flight speed status, a global engine status, a global front undercarriage status and a global main undercarriage status and, on an output side of the fourth logic operation unit, set the flight status signal at a positive logical level if at least one predeterminable number N6, N6<4, in particular N6=3, of the statuses received has a positive logical level.

8. A system comprising:

at least one apparatus according to claim 1; and a bus which is capable of transmitting at least the provided flight speed signals, the engine status signals, the evacuation signals, the front undercarriage status signals and the main undercarriage status signals to the device.

9. The system according to claim 8, wherein:

there are provided a number of dedicated calculation units coupled to the bus which provide redundant flight speed signals via the bus to the device.

10. The system according to claim 8, wherein:

a number of redundant engine control devices coupled to the bus are provided in each case for an engine of a number of engines of the aircraft, where $$N7 = \frac{N2}{N8},$$

and provide redundant engine status signals for the corresponding engine via the bus to the device.

11. The system according to claim 8, wherein:

a number of redundant main undercarriage control devices coupled to the bus are provided in each case for a main undercarriage of a number of main undercarriages of the aircraft, where $$N9 = \frac{N5}{N10},$$

and provide redundant main undercarriage status signals for the corresponding main undercarriage via the bus to the device.

12. The system according to claim 8, wherein:

there is provided at least one cabin communication data system coupled to the bus which provides redundant evacuation signals via the bus to the device.

13. The system according to claim 8, wherein:

there are provided a number of redundant front undercarriage control devices coupled to the bus which provide redundant front undercarriage status signals for a front undercarriage of the aircraft via the bus to the device.

14. A vehicle comprising:

at least one system according to claim 8.

15. A vehicle comprising:

at least one apparatus according to claim 1.

16. A system comprising:

an apparatus according to claim 1; and at least one means comprising:

a second input section, configured to receive the calculated flight status signal from the device, a number of differently provided flight altitude signals, the number of differently provided evacuation signals and at least one pressure differential signal;

at least one signal processing unit configured to generate a door closure signal for at least one door of the aircraft as a function of the calculated flight status signal, the number of differently provided flight altitude signals, the number of differently provided evacuation signals and the at least one pressure differential signal; and a second signal output section configured to output the generated door closure signal.

17. The system according to claim 16, wherein:

there is provided a flight lock actuator which receives the generated door closure signal and, as a function thereof, locks at least one door of the aircraft.

18. The system according to claim 16, wherein:

the at least one signal processing unit comprises a number of evaluation units, the respective $n13^{th}$ evaluation unit, $n13 \in [1, \ldots, N13]$, being configured to set an $n13^{th}$ cruising altitude status at a positive logical level on an output side if the respective flight altitude signal received on an input side is greater than a predeterminable first threshold value, set it to a negative logical level if the respective flight altitude signal received on the input side is less than a second predeterminable second threshold value, which is less than the first threshold value, and leave the logical level of the cruising altitude status unchanged as long as the flight altitude signal received on the input side is less than or equal to the first threshold value and is greater than or equal to the second threshold value.

19. The system according to claim 18, wherein:

the at least one signal processing unit comprises a fifth logic operation unit configured to set on the output side, an item of global cruising altitude display data at a positive logical level if the majority of the flight altitude statuses received on an input side have a negative logical level.

20. The system according to claim 18, wherein:
the means further comprises a seventh logic operation unit configured to receive, on the input side, the global cruising altitude display data, the global evacuation status, the flight status signal and the pressure differential status, and subject thereto, generate the door closure signal.

21. The system according to claim 20, wherein:
the seventh logic operation unit is constructed as an AND gate.

22. The system according to claim 16, wherein:
the means further comprises a sixth logic operation unit configured to carry out a NOR logic operation on the evacuation signals received on an input side of the sixth logic operation unit in order to provide a global evacuation status on an output side of the sixth logic operation unit.

23. The system according to claim 16, wherein:
the means further comprises an additional threshold value unit configured to set, on an output side of the additional threshold value unit, a pressure differential status at a positive logical level if the pressure differential signal received, which indicates a pressure difference between a cabin pressure of the cabin of the aircraft and an external atmospheric pressure, is greater than a predeterminable threshold value.

24. A vehicle comprising:
at least one system according to claim 16.

25. A method for providing an aircraft flight status signal which indicates whether the aircraft is in the air or on the ground, comprising the following steps:
 providing a number of different flight speed signals;
 providing a number of different engine status signals;
 providing a number of evacuation signals;
 providing a number of different main undercarriage status signals;
 providing a number of different front undercarriage status signals; and
 calculating the flight status signal as a function of the different flight speed signals, the different engine status signals, the evacuation signals, the different front undercarriage status signals and the different main undercarriage status signals.

26. A method for generating a door closure signal for locking at least one door of an aircraft, comprising the following steps:
 calculating a flight status signal in accordance with the method according to claim 25;
 providing a number of different flight altitude signals;
 providing a number of evacuation signals;
 providing at least one pressure differential signal; and
 calculating the door closure signal from the calculated flight status signal, the flight altitude signals, the evacuation signals and the pressure differential signal.

* * * * *